United States Patent [19]
Chabatake

[11] Patent Number: 6,020,573
[45] Date of Patent: Feb. 1, 2000

[54] LASER BEAM MACHINING APPARATUS

[75] Inventor: Yasunori Chabatake, Toyama, Japan

[73] Assignee: Nippei Toyama Corporation, Tokyo, Japan

[21] Appl. No.: 08/961,765

[22] Filed: Oct. 31, 1997

[30] Foreign Application Priority Data

Oct. 31, 1996 [JP] Japan ................................. 8-290592

[51] Int. Cl.$^7$ ................................. B23K 26/08
[52] U.S. Cl. ......................... 219/121.82; 219/121.67
[58] Field of Search ................. 219/121.82, 121.67, 219/121.72; 198/468.6, 468.9

[56] References Cited

U.S. PATENT DOCUMENTS

| | | | |
|---|---|---|---|
| 4,760,237 | 7/1988 | Mizukado et al. | 219/121.82 |
| 5,061,839 | 10/1991 | Matsuno et al. | 219/121.83 |
| 5,624,587 | 4/1997 | Otsuki et al. | 219/121.83 |

FOREIGN PATENT DOCUMENTS

| | | | |
|---|---|---|---|
| 527114 | 2/1993 | European Pat. Off. | 219/121.82 |
| 63-16895 | 1/1988 | Japan. | |
| 6-15475 | 1/1994 | Japan. | |
| 96/11769 | 4/1996 | WIPO | 219/121.82 |

*Primary Examiner*—Geoffrey S. Evans
*Attorney, Agent, or Firm*—Sughrue, Mion, Zinn, Macpeak & Seas, PLLC

[57] ABSTRACT

A laser beam machining apparatus capable of eliminating a complicated unit arranged to vertically move pallets and adapted to a pallet storage unit for making the heights of upper and lower pallets to be constant so as to simplify the structure thereof and improve the working efficiency. A chain drive mechanism is mounted on a frame, and upper and lower machining pallets are connected to intermediate positions of a chain of the chain drive mechanism. When the lower-stage machining pallet has been moved to a lower machining position, a laser-beam machining head is moved downwards toward a work piece placed on the lower machining pallet to machine the lower work piece without vertical movement of the lower-stage machining pallet. The laser machining head is vertically movable in accordance with the height of the workpiece on each of the machining pallets.

20 Claims, 12 Drawing Sheets

LASER BEAM MACHINING APPARATUS

BACKGROUND OF THE INVENTION

The present invention relates to a laser beam machining apparatus in which work pieces, such as iron plates, are placed on machining pallets and each of the work pieces is moved from a setting position to a laser machining position so that the work pieces are machined. More particularly, the present invention relates to a laser beam machining apparatus which is capable of omitting a unit for vertically moving pallets from a pallet storage unit to thereby improve the working efficiency with a simple structure.

In Japanese Patent Unexamined Publication No. Hei. 6-15475, disclosed is a carriage unit adaptable to a laser beam machining apparatus of the foregoing type and attempted to improve the rate of operation of the laser beam machining apparatus by employing a structure that a plurality of pallets are stacked in a vertical direction (i.e. upper and lower direction) and accommodated in a pallet storage unit and the pallets are exchanged whenever a machining operation is completed.

However, the above-mentioned carriage unit suffers from a problem in that a large space is required to install the pallet storage unit and large facilities relating to the laser beam machining apparatus must be provided.

Moreover, flat work pieces and stereoscopic work pieces each having a height larger than that of the flat work piece cannot mixedly be accommodated in corresponding pallets.

On the other hand, the Japanese Patent Unexamined Publication No. Sho. 63-16895 teaches a technique relating to the carriage unit in which only two pallet storage units are provided to reduce the required space and to minimize the facilities for handling pallets.

The above-mentioned carriage unit has a structure that two pallet-accommodating portions are vertically arranged for a pallet storage unit to accommodate pallets for only the upper portion and those for only the lower portion in the upper and lower pallet accommodating portions. To make the height at which the machine performs the operation to be constant, a unit for vertically moving the pallets is provided for the pallet storage unit. Thus, a work piece is placed on the lower pallet to wait for start of a next machining operation during a process in which the material on the upper pallet is being machined.

After the operation for machining the work piece on the upper pallet has been completed, the upper pallet is accommodated in the upper portion of the pallet storage unit, and then the pallet storage unit is moved upwards by the carriage unit to carry the lower pallet to the machine. During the process for machining the work piece on the lower pallet, a machined product in the upper portion of the pallet storage unit is extracted to be changed for a new work piece.

When the operation for machining the lower work piece has been completed, the pallet is returned to the lower pallet storage unit. Then, the pallet storage unit is moved downwards by the unit for vertically moving the pallet storage unit to move the upper pallet to the machine. The above-mentioned vertical movements are repeated so that the operation for machining work pieces with laser beams is performed.

The conventional carriage unit for the laser beam machining apparatus must be provided with an elevating unit for the pallet storage unit to make the heights of the plurality of the moving pallets to be constant. Thus, there arises a problem in that the structure becomes too complicated. Moreover, the pallet storage units respectively arranged for only the upper portion and the lower portion require the operation for vertically moving the pallets whenever the machining operation is completed. Thus, a long time is required and thus a problem arises in that a waiting time is elongated excessively during the machining operation which is performed by the laser beam machining apparatus.

SUMMARY OF THE INVENTION

In view of foregoing, an object of the present invention is to provide a laser beam machining apparatus capable of overcoming the problems experienced with the conventional laser beam machining apparatus, simplifying the structure by omitting a unit for vertically moving each of the plurality of pallets, which are respectively disposed on a plurality of stages stacked in a vertical direction, and improving the efficiency of performing the laser-beam machining operation.

The above-mentioned objects can be attained by a laser beam machining apparatus, according to the present invention, comprising:

a frame;

a plurality of machining pallets respectively disposed on a plurality of stages stacked in a vertical direction with respect to the frame for supporting work pieces;

a carriage mechanism for reciprocating and guiding each of the machining pallets between a setting position and a machining position on each stage, the carriage mechanism having a plurality of guide mechanisms for respectively guiding the machining pallets with respect to the frame in such a manner that each of the mechanism pallets is able to reciprocate between the setting position and the machining position therealong on each stage; and a laser machining head vertically movable in accordance with the height of the work piece on each of the machining pallets for machining the work piece with laser beams.

The above-mentioned structure of the laser beam machining apparatus may be formed in such a manner that the machining pallets are alternately moved to the corresponding machining positions by a single carriage mechanism.

The above-mentioned structure of the laser beam machining apparatus may be formed in such a manner that the machining pallets are respectively moved by independent carriage mechanisms.

The above-mentioned structure of the laser beam machining apparatus may be formed in such a manner that the carriage mechanism is one of a chain drive mechanism, a ball screw feed drive mechanism, a belt drive mechanism, a cylinder mechanism and a rack-and-pinion mechanism The above-mentioned structure of the laser beam machining apparatus may be formed in such a manner that each of the guide mechanisms comprise:

a plurality of support rollers rotatively disposed on both side portions of the frame through a bracket member for guiding and supporting the corresponding machining pallet in such a manner that the corresponding machining pallet is able to reciprocate in a pallet moving direction; and a pair of pallet guide bars for guiding both side surfaces of the corresponding machining pallet in the pallet moving direction.

The above-mentioned structure of the laser beam machining apparatus may be formed in such a manner that the lowermost machining pallet has a deep pallet in the lower portion thereof, and a work piece support portion of the lowermost machining pallet is opened when the deep pallet is used.

The above-mentioned structure of the laser beam machining apparatus may be formed by further comprising:

pallet detection means for each stage which detects movement of the corresponding machining pallet to the corresponding machining position; and a control unit for downwardly moving the laser machining head to a predetermined downward height in response to a detection signal supplied from the pallet detection means to be adaptable to the position of the corresponding machining pallet and then further downwardly moving the laser machining head to a machining height, apart from the work piece by a predetermined distance, at which the work piece on the corresponding machining pallet is machined.

The above-mentioned structure of the laser beam machining apparatus may be formed by further comprising:

position detection means for each stage which detects the position of the machining pallet prior to movement of the machining pallet on each stage to each machining position;

pallet detection means for each stage which detects the movement of the machining pallet on each stage to each machining position; and a control unit for downwardly moving the laser machining head to a predetermined downward height in response to a detection signal supplied from the position detection means to be adaptable to the position of the corresponding machining pallet, and further downwardly moving the laser machining head to a machining height, apart from the work piece by a predetermined distance, at which the work piece is machined after the movement of the corresponding machining pallet to the corresponding machining position has been detected by the pallet detection means.

The above-mentioned structure of the laser beam machining apparatus may be formed in such a manner that the laser machining head comprises:

a distance detection means for detecting a distance between a nozzle of the laser machining head and the work piece on the machining pallet; and a control unit for moving the laser machining head to a machining height at which the work piece on the machining pallet is machined in response to a detection signal supplied from the distance detection means.

The above-mentioned structure of the laser beam machining apparatus may be formed in such a manner that the machining pallets are respectively disposed on not less than three stages stacked in the vertical direction, and a machining pallet waiting position is provided at an intermediate position between the setting position for each stage at which work pieces are mounted and removed and the machining position for each stage at which laser machining is performed.

Other objects, features and advantages of the invention will be evident from the following detailed description of the preferred embodiments described in conjunction with the attached drawings.

DETAILED DESCRIPTION OF THE PREFERRED EMBODIMENTS

An embodiment of the present invention will now be described with reference to FIGS. 1 to 12.

Figure 1:
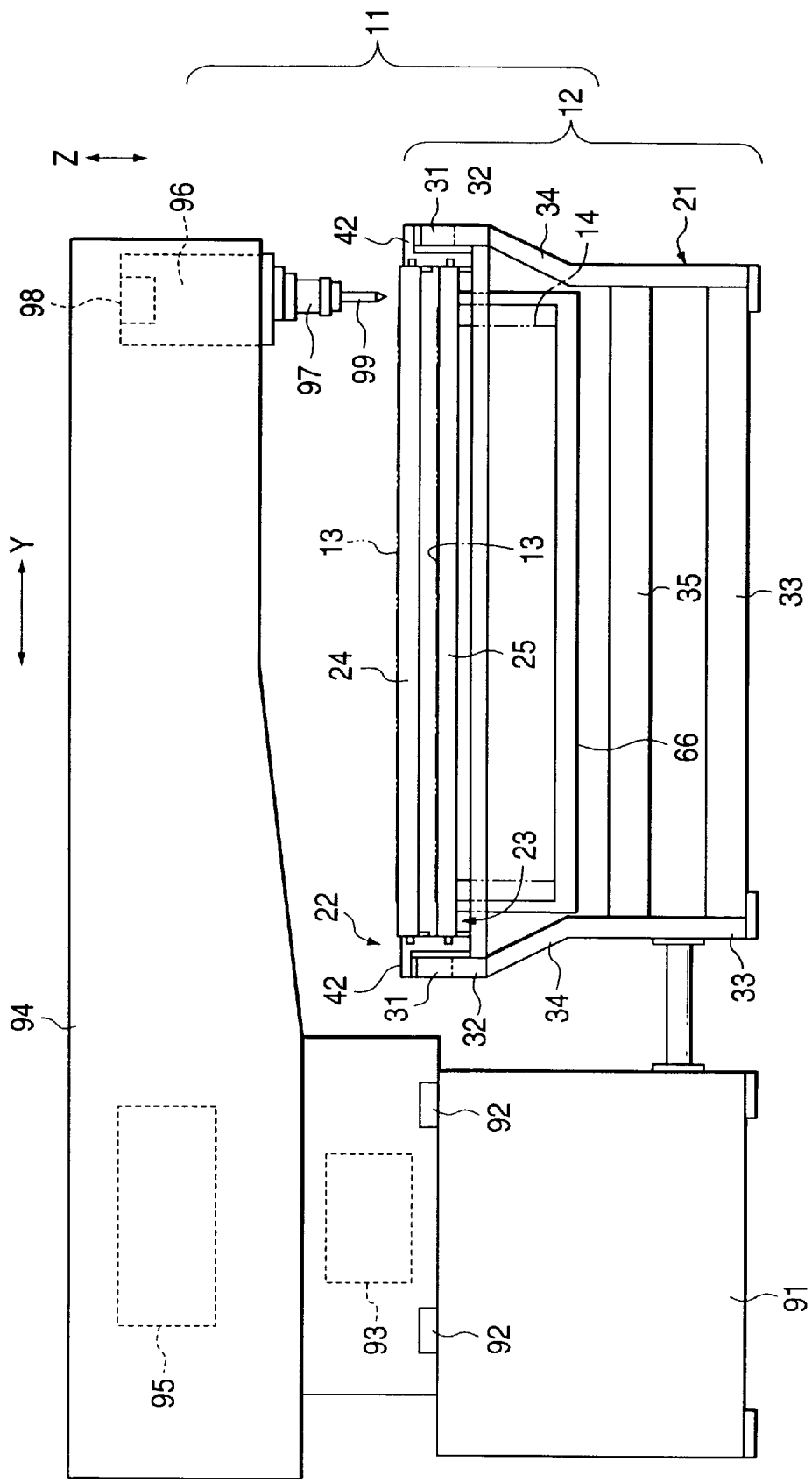
FIG. 1 is a side view showing the overall structure of a laser beam machining apparatus according to the present invention.
Figure 2:
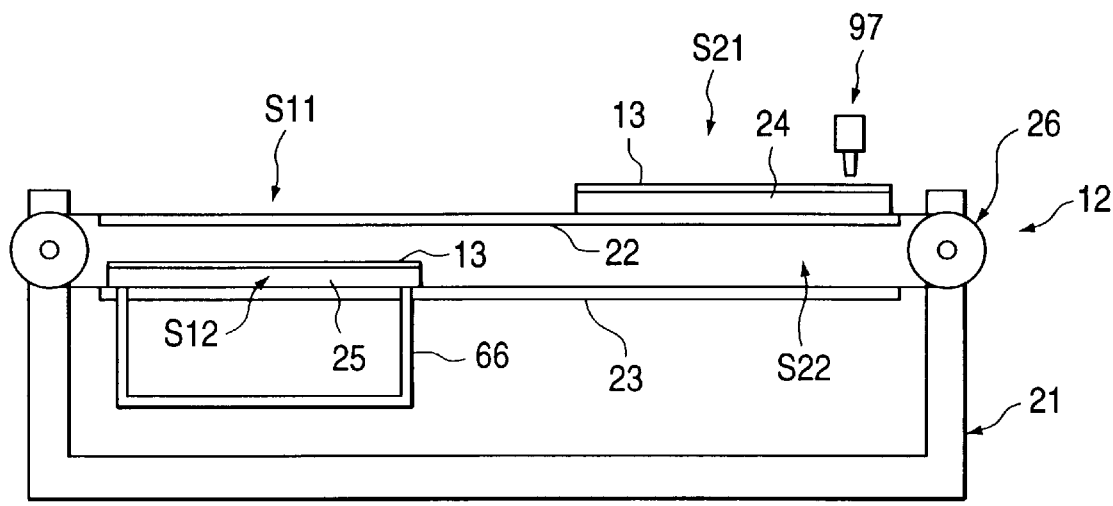
FIG. 2 is a front view showing the principle of the laser beam machining apparatus according to the present invention.
Figure 3:
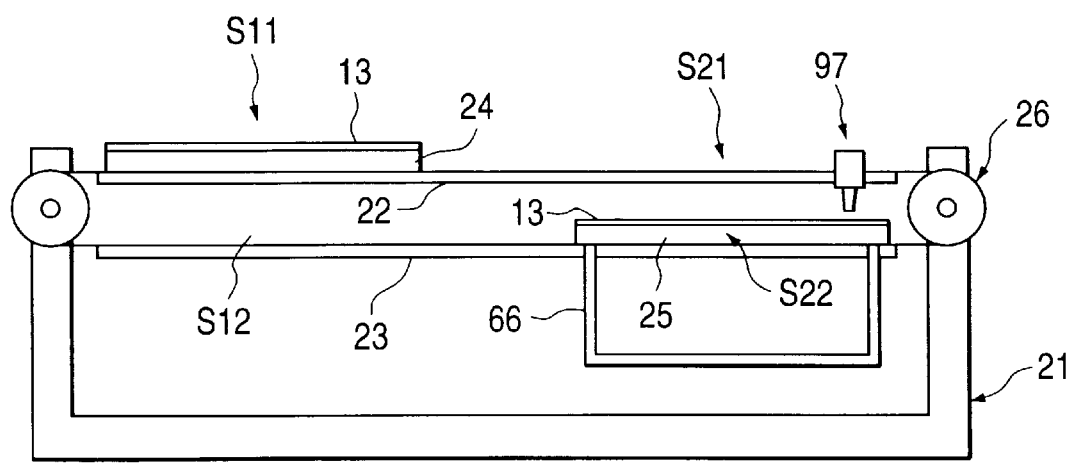
FIG. 3 is a front view showing the principle of the laser beam machining apparatus according to the present invention.

FIG. 1 shows the overall structure of a laser beam machining apparatus 11 according to the present invention. FIGS. 2 and 3 show the principle of the present invention. The laser beam machining apparatus 11 comprises a work-piece supply unit 12 and a laser-beam machining head 97 supported on the work-piece supply unit 12 and arranged to machine a work piece 13.

Initially, the principle of the present invention will now be described with reference to FIGS. 1 and 2.

A frame 21 for forming the work-piece supply unit 12 is provided with upper and lower guide mechanisms 22 and 23. The upper and lower guide mechanisms 22 and 23 are respectively provided with an upper-stage machining pallet 24 and a lower-stage machining pallet 25 for supporting the work piece 13 in such a manner that reciprocating motions in the lengthwise direction (in the horizontal direction of FIGS. 2 and 3) are permitted. The upper and lower-stage machining pallets 24 and 25 are, by a common chain drive mechanism 26, permitted to move between left-hand upper and lower setting positions S11 and S12 and right-hand upper and lower machining positions S21 and S22 when viewed in FIG. 2.

AS shown in FIG. 2, the work piece 13 on the upper-stage machining pallet 24 is machined by the laser-beam machining head 97 after the upper-stage machining pallet 24 has been positioned and held by the upper machining position S21. After the machining operation has been completed, the upper-stage machining pallet 24 is, as shown in FIG. 3, moved from the upper machining position S21 to the upper setting position S11. On the other hand, the lower-stage machining pallet 25 positioned at the lower setting position S12 is moved and positioned to the lower machining position S22. Then, the machining head 97 is moved downwards toward the work piece 13 on the lower-stage machining pallet 25 so that the work piece 13 in the lower stage is machined with laser beams.

A deep pallet 66 having a satisfactorily large depth is mounted on the lower-stage machining pallet 25 to enable a high work piece 14 in place of the flat work piece 13.

The structure of the laser beam machining apparatus 11 according to this embodiment will now be described with reference to FIG. 1 and FIGS. 4 to 12.

Figure 4:
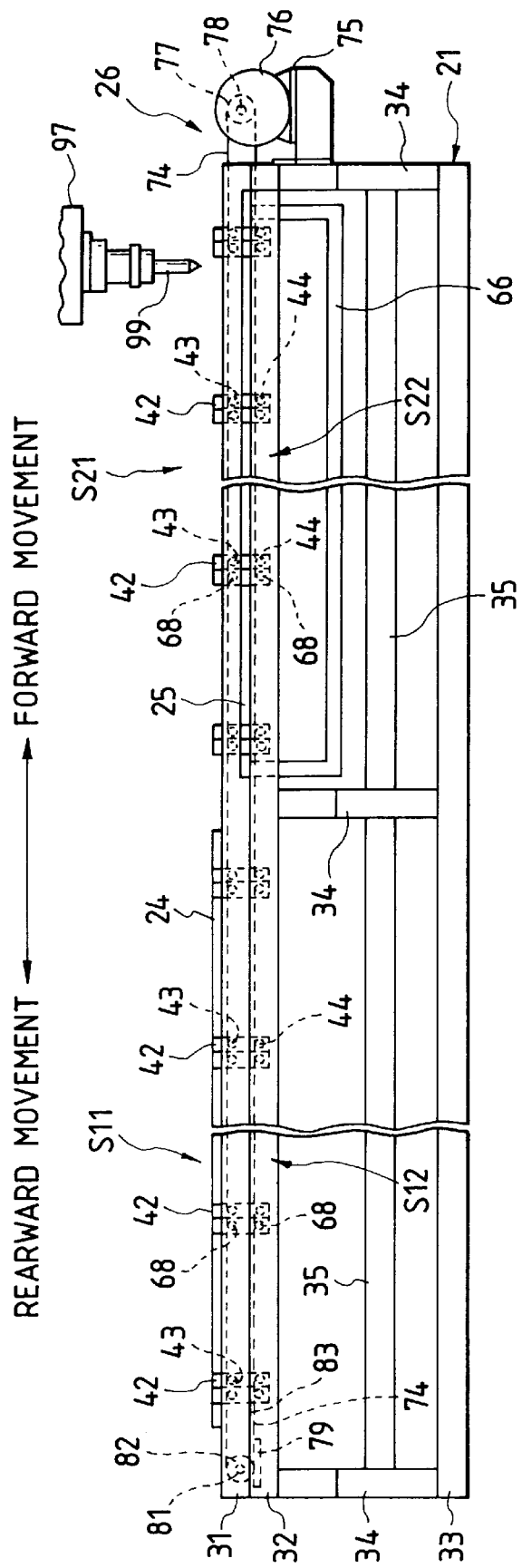
FIG. 4 is a partially-omitted front view showing a work-piece supply unit.
Figure 5:
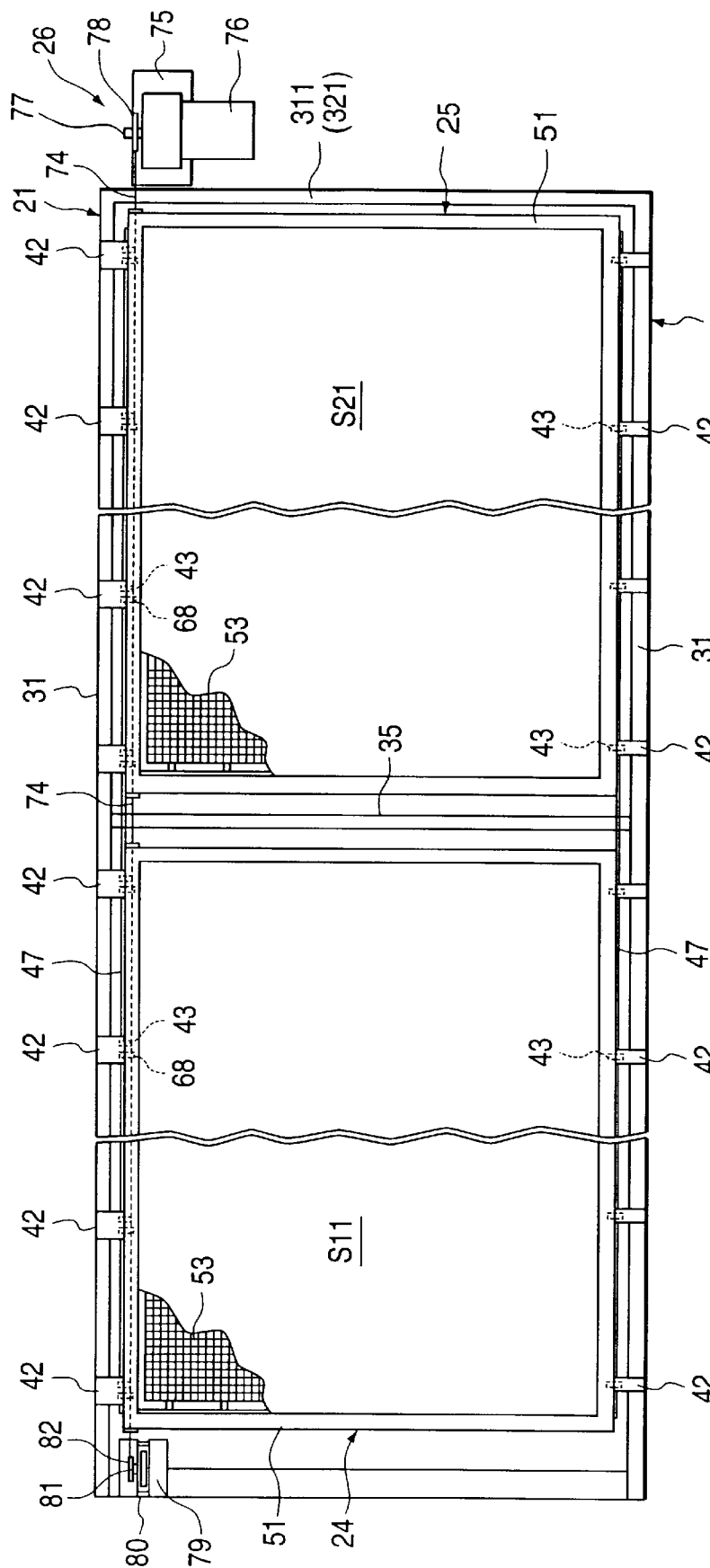
FIG. 5 is a partially-omitted plan view showing the work-piece supply unit.

As shown in FIGS. 1, 4 and 5, the frame 21 has a first horizontal-square-pipe 31 disposed at an uppermost position and formed into a rectangular frame shape and a second horizontal-square-pipe 32 welded and secured to a portion just below the first horizontal-square-pipe 31 and having a rectangular cross sectional shape. Moreover, the frame 21 has a third horizontal-square-pipe 33 disposed on the ground apart from the second horizontal-square-pipe 32 for a predetermined distance and having a rectangular cross sectional shape, a plurality of vertical square pipes 34 for establishing the connection between the second horizontal-square-pipe 32 and the third horizontal-square-pipe 33 and a plurality of reinforcing square pipe 35 horizontally arranged and connected between the vertical square pipes 34.

Figure 6:
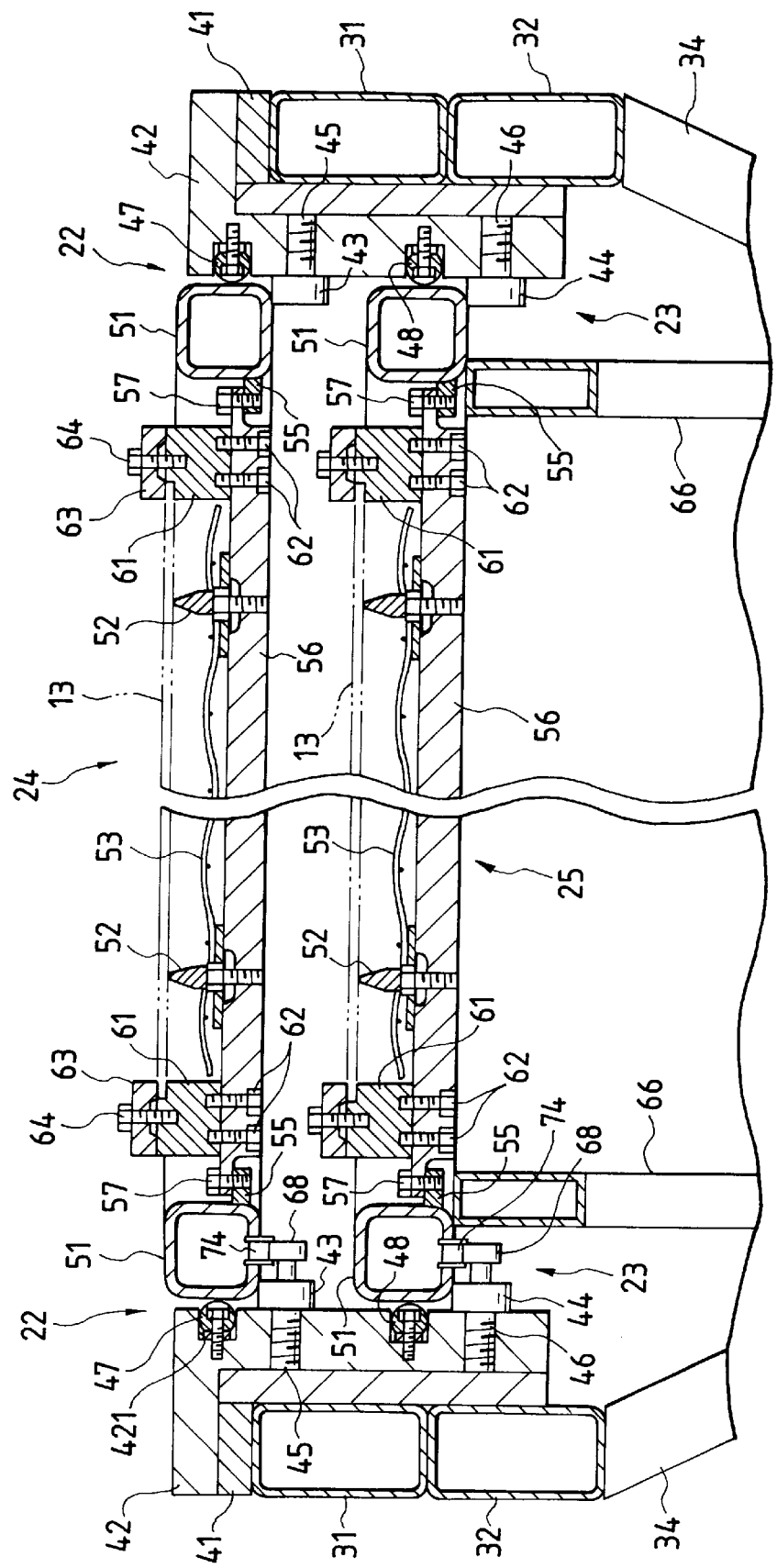
FIG. 6 is an enlarged cross sectional view showing an essential portion of the work-piece supply unit.
Figure 7:
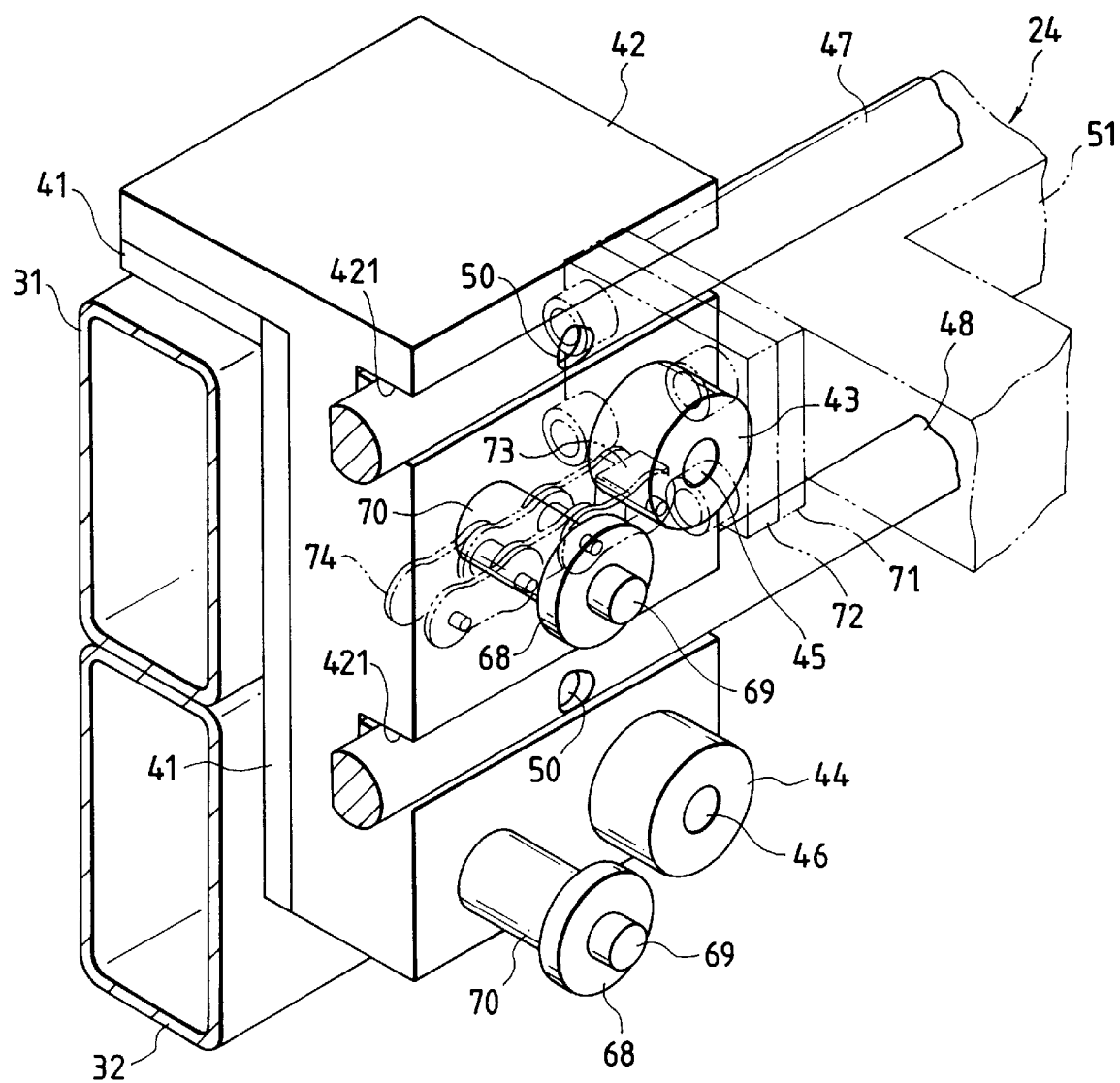
FIG. 7 is a partial perspective view showing a mechanism for guiding a machining pallet.
Figure 8:
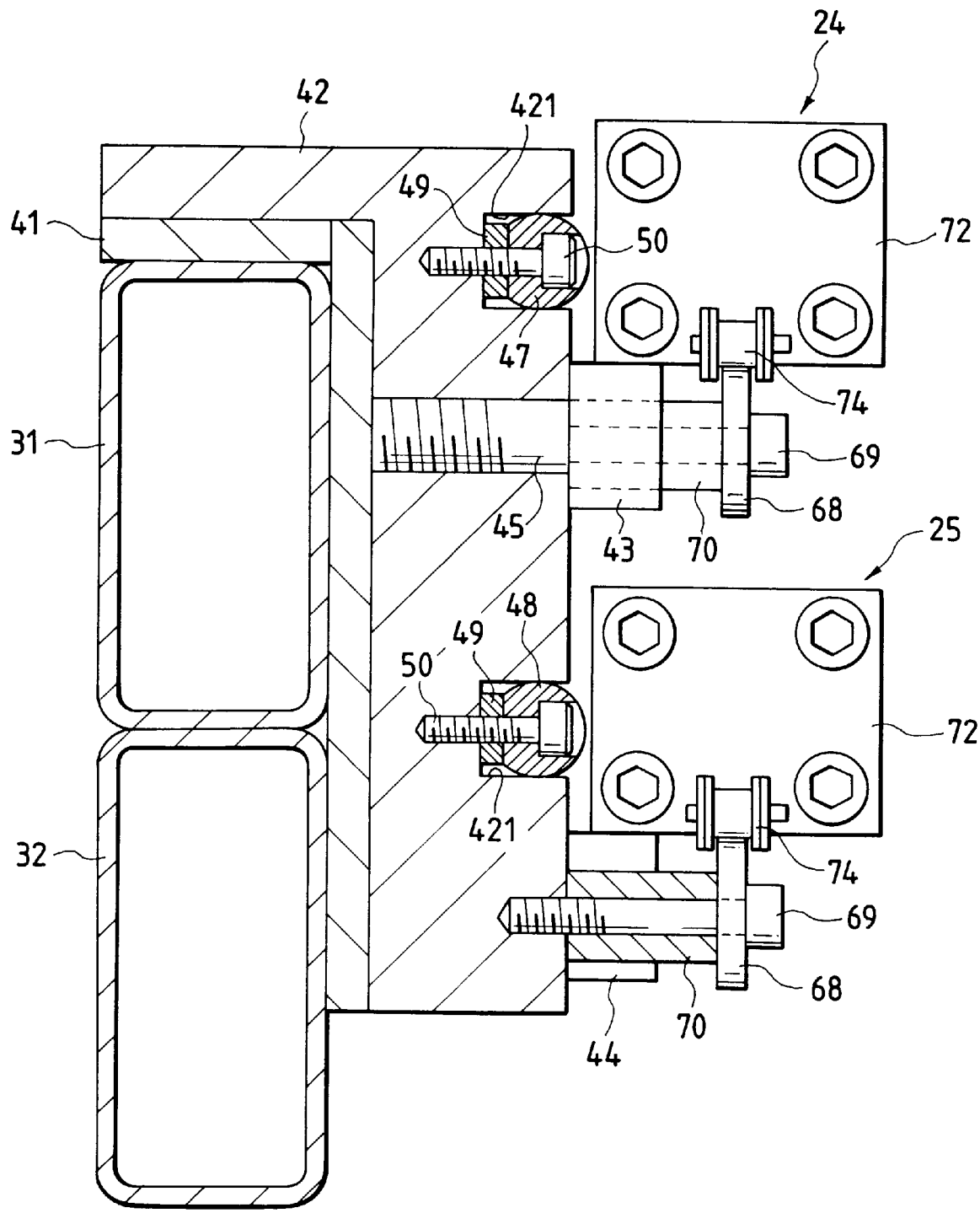
FIG. 8 is an enlarged cross sectional view showing the mechanism for guiding a machining pallet.

As shown in FIG. 6, upper and lower guide mechanisms 22 and 23 for guiding the upper-stage machining pallet 24 and the lower-stage machining pallet 25 are attached to the horizontal square pipes 31 and 32 disposed at the right and left-hand positions. The upper and lower guide mechanisms 22 and 23 will now be described. As shown in FIGS. 7 and 8, a plurality of brackets 42 are, through spacers 41, secured to the upper surface of the first horizontal-square-pipe 31 and the inner surfaces of the two horizontal square pipes 31 and 32. Upper and lower pallet-support rollers 43 and 44 for supporting the upper-stage machining pallet 24 and the lower-stage machining pallet 25 are rotatively supported by the brackets 42 through support shafts 45 and 46. A pair of recesses 421 disposed vertically are formed on the side surfaces of each of the brackets 42. The upper-pallet guide bar 47 and the lower-pallet guide bar 48 extending in the lengthwise (forward-rearward) direction (i.e. a pallet moving direction) are received by the recesses 421 and secured to the brackets 42 with bolts 50 through washers 49.

The upper and lower-pallet guide bars 47 and 48 limit the positions of the right and left side surfaces of the upper-stage machining pallet 24 and the lower-stage machining pallet 25 to prevent their horizontal meandering with slight gaps. The upper and lower-stage machining pallets 24 and 25 are able to reciprocate in the lengthwise direction in such a manner that their lower surfaces are supported by upper pallet-support rollers 43 and lower pallet-support rollers 44 and their side surfaces are guided by the guide bars 47 and 48.

The structures of the upper and lower-stage machining pallets 24 and 25 will now be described with reference to FIGS. 6 and 9.

Figure 9:
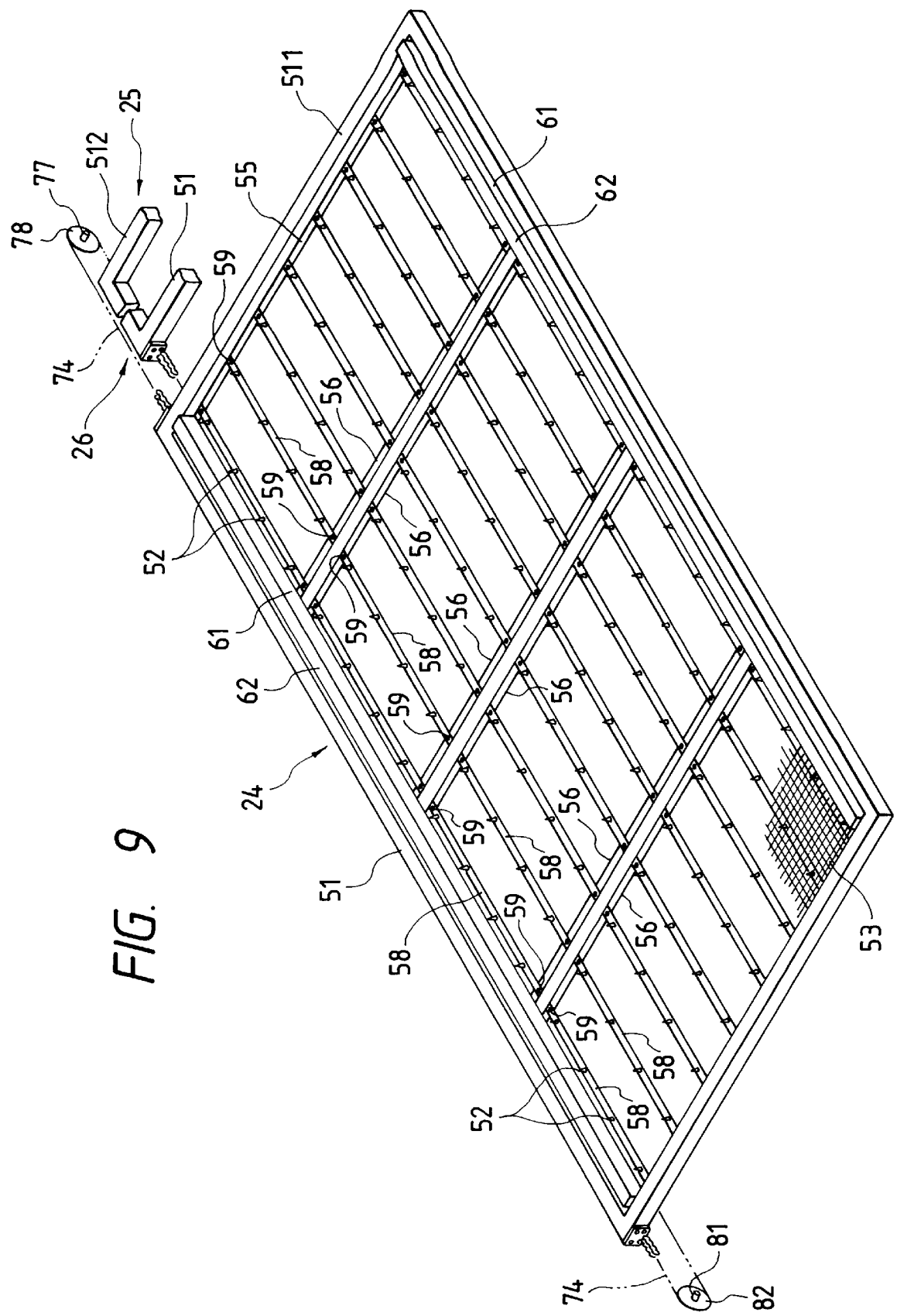
FIG. 9 is a perspective view showing a pallet and a chain drive mechanism.

Each of the upper and lower-stage machining pallets 24 and 25 has a square frame 51, as shown in FIG. 9. A bracket 55 is welded to the overall inner surface of the frame 51. Two ends of horizontal support bar 56 are horizontally arranged and connected to the bracket 55 with bolts 57. As shown in FIG. 9, two lengthwise directional ends of a horizontal support bar 58 extending in the lengthwise direction are arranged between the bracket 55 and the horizontal support bar 56 and between the horizontal support bars 56 and secured with bolts 59. Moreover, projections 52 are formed on the upper surfaces of the two horizontal support bars 56 and 58. The projections 52 are arranged to project through meshes in a state where a wire net 53 is placed on the horizontal support bars 56 and 58. The projections 52 and the wire nets 53 form a portion for supporting a work piece.

As shown in FIG. 6, fixing blocks 61 for fixing the work piece 13 are, with bolts 62, secured to the two horizontal ends of the horizontal support bar 56. A clamp bar 63 for clamping the ends of the work piece 13 supported by the projections 52 is tightened and secured to the fixing block 61 with bolts 64. As shown in FIG. 1, a deep pallet 66 for accommodating a work piece having, for example, a stereoscopic shape in place of the work piece 13 is provided for the lower-stage machining pallet 25. The upper end of the deep pallet 66 is, at a position just below the bracket 55, secured to the frame 51 by welding or the like. When the horizontal support bars 56 and 58 supported and secured to the lower-stage machining pallet 25 are suspended from the secured state with the bolts 57 and 59 and all members 53, 56, 58, 61 and 63 and the projections 52 on the inside of the square 51 are removed to release the portion for supporting the work piece and leave only the frame 51, a work piece 14 in the form of, for example, a box-like shape having a large height can be accommodated in the deep pallet 66 so as to be conveyed from the lower setting position S12 to the lower machining position S22 so as to be machined with laser beams.

The structure of the chain drive mechanism 26 arranged to reciprocatively move the upper and lower-stage machining pallets 24 and 25 in the lengthwise will now be described with reference to FIGS. 4 to 9.

As indicated with a dashed line shown in FIG. 7, a mounting plate 71 is welded to each of the two lengthwise directional corners of the frame 51 forming the upper and lower-stage machining pallets 24 and 25. A mounting bracket 72 is secured to the mounting plate 71 with bolts. Moreover, a mounting projection 73 is welded to the mounting bracket 72, while an end of a chain 74 is connected to the mounting projection 73. The frame 21 horizontally supports the mounting frame 75, as shown in FIGS. 4 and 5. A motor 76 having speed reduction gears is secured to the mounting frame 75. A driving sprocket wheel 78 is connected to a drive shaft 77 of the motor 76 having speed reduction gears, and an intermediate portion of the chain 74 having two ends connected to the front ends of the upper-stage machining pallet 24 and the lower-stage machining pallet 25 is wound around the driving sprocket wheel 78. On the other hand, a mounting frame 79 is secured to the rear end of the frame 21. A rotational shaft 81 is, through a bearing 80, supported by the mounting frame 79 at a predetermined position 50 as to be capable of rotating. A follower sprocket wheel 82 is supported by the rotational shaft 81. An intermediate portion of the chain 74 having two ends connected to the two rear ends of the upper-stage machining pallet 24 and the lower-stage machining pallet 25 is wound around the follower sprocket wheel 82.

Therefore, when the driving sprocket wheel 78 is rotated clockwise when viewed in FIG. 4 by the motor 76 having speed reduction gears, the upper-stage machining pallet 24 is moved from the upper setting position S11 to the upper machining position S21. On the other hand, the lower-stage machining pallet 25 is moved from the lower machining position S22 to the lower setting position S12 in synchronization with the movement of the upper-stage machining pallet 24. When the motor 76 having speed reduction gears is rotated reversely, the upper-stage machining pallet 24 is moved from the upper machining position S21 to the upper setting position S11. On the other hand, the lower-stage machining pallet 25 is moved from the lower setting position S12 to the lower machining position S22 in synchronization with the movement of the upper-stage machining pallet 24.

As shown in FIGS. 7 and 8, the brackets 42 among the brackets 42 that correspond to the chain 74 are provided with a chain guide 68 for guiding the lower portion of the chain 74 by a bolt 69 and a collar 70.

Figure 10:
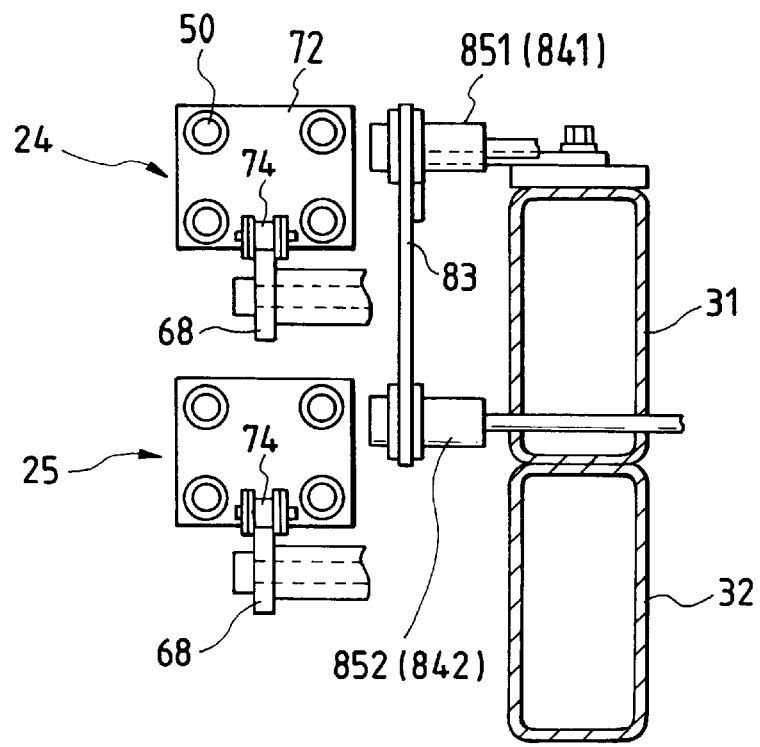
FIG. 10 is cross sectional view showing a state where a sensor has been mounted.

As shown in FIG. 10, a mounting bracket 83 is secured to the first and second horizontal square pipes 31 and 32. Upper and lower deceleration sensors 841 and 842 for controlling the movements of the upper-stage machining pallet 24 and the lower-stage machining pallet 25 to the upper and lower machining positions S21 and S22 and upper and lower stoppage sensors 851 and 852 are provided at predetermined positions of the mounting bracket 83. When the position of, for example, the front end of the frame 51 of the upper-stage machining pallet 24 is detected by the upper deceleration sensor 841, the rotational speed of the motor 76 having speed reduction gears is switched from high speed to low speed. When the front end of the frame 51 of the upper-stage machining pallet 24 is detected by the upper stoppage sensor 851, a stop signal is output to the motor 76 having speed reduction gears so that the upper-stage machining pallet 24 is stopped.

Figure 11:
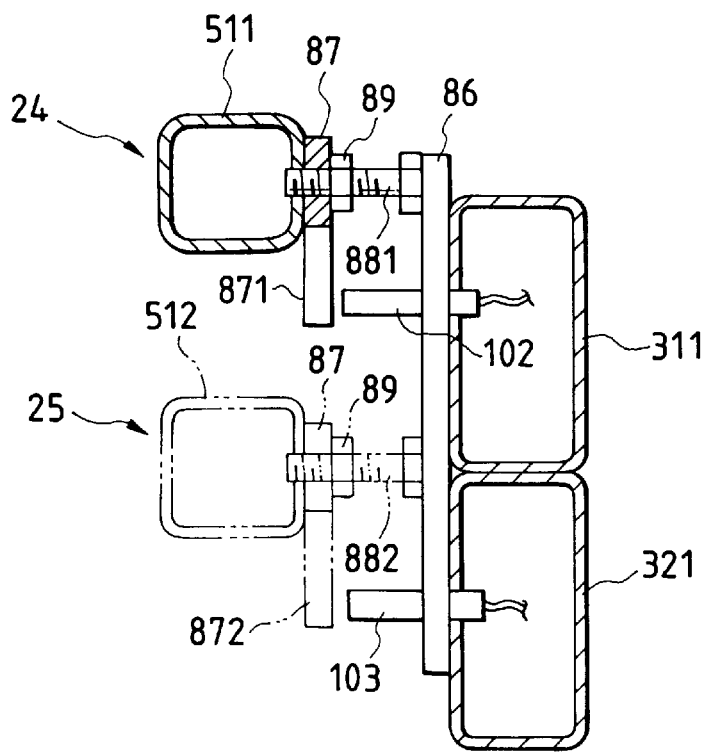
FIG. 11 is a cross sectional view showing a mechanism for controlling the position at which the work piece on the machining pallet is machined.

A stopper plate 86 is secured to front-end square pipes 311 and 321 (see FIG. 5) of the first and second horizontal square pipes 31 and 32, as shown in FIG. 11. A mounting plate 87 is welded to front-end frames 511 and 512 (see FIG. 9) of the upper and lower-stage machining pallets 24 and 25. Upper and lower stop bolts 881 and 882 are received by the mounting plate 87 with the threads. After the positions of the stop bolts 881 and 882 at which they are received with threads have been adjusted, the stop bolts 881 and 882 can be secured to predetermined positions by nuts 89. When the upper and lower-stage machining pallets 24 and 25 have been moved to the upper or lower upper machining position S21 or S22, the stop bolt 881 or 882 is brought into contact with the stopper plate 86 so that the lengthwise directional positions of the upper and lower-stage machining pallets 24 and 25 at the upper or lower machining position S21 or S22 are controlled.

The laser-beam machining head 97 will now be described.

As shown in FIG. 1, a frame 91 is provided with guide rails 92. A frame 94 is supported by the guide rails 92 with an X-axis directional drive mechanism 93 in such a manner that the frame 94 is able to reciprocate in the X direction (in the lengthwise direction which is a direction perpendicular to the surface of the drawing sheet on which FIG. 1 is drawn). A saddle 96 is supported by the frame 94 with a Y-axis directional drive mechanism 95 in such a manner that the saddle 96 is able to reciprocate in the Y direction (in the horizontal direction when viewed in FIG. 1). Moreover, the laser-beam machining head 97 is attached to the lower end of the saddle 96 with a 2-axis directional drive mechanism 98 serving as an elevating mechanism in such a manner that the laser-beam machining head 97 is able to reciprocate in the Z direction (the vertical direction when viewed in FIG. 1). A nozzle 99 for irradiating the work piece 13 with laser beams is attached to the lower end of the laser-beam machining head 97 so that laser beams are emitted from a laser-beam generating unit (not shown).

Figure 12:
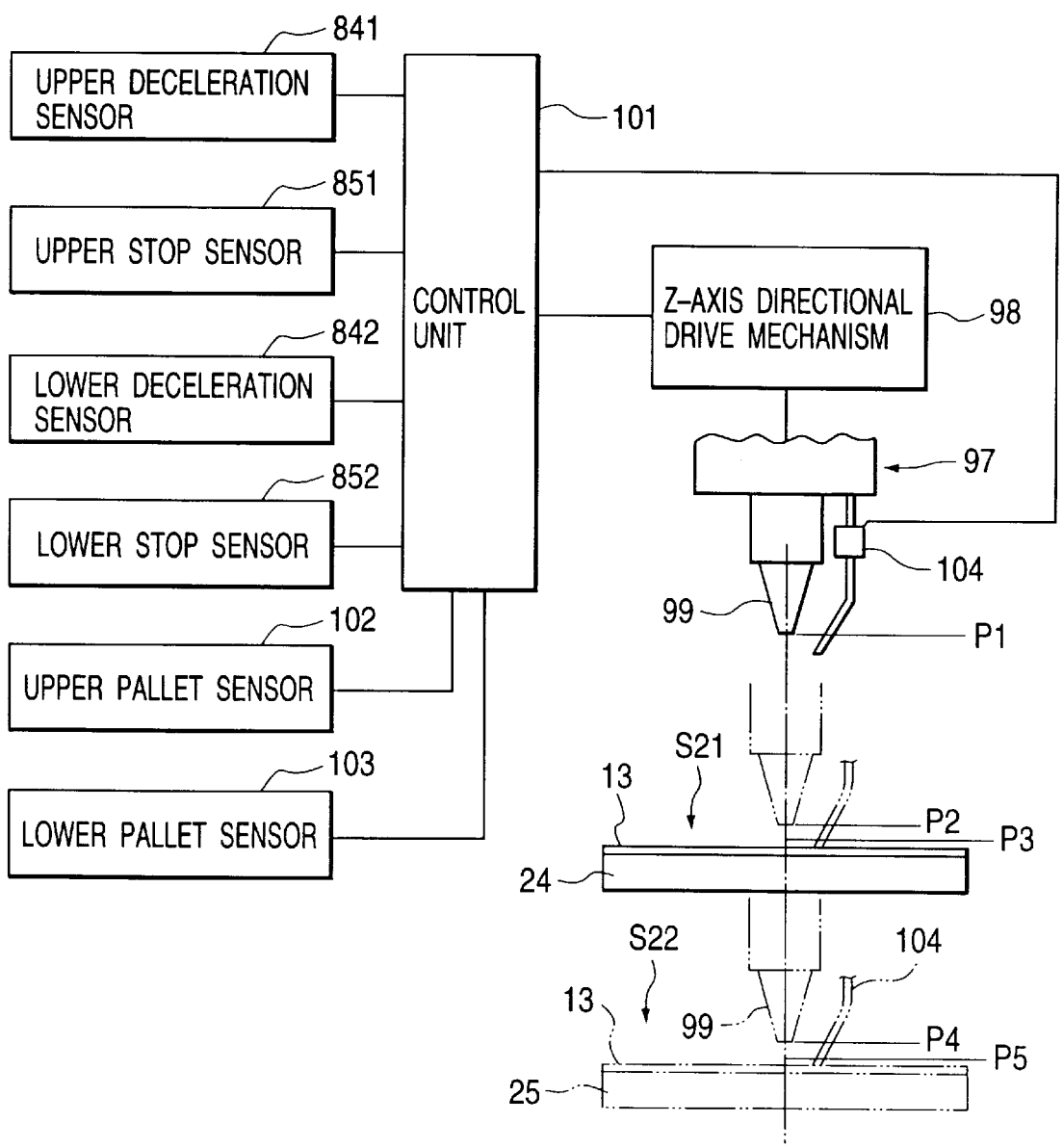
FIG. 12 is a diagram showing a machining head and a unit for controlling the machining head according to the embodiment of the present invention.

As shown in FIG. 12, a control unit 101 is connected to the Z-axis directional drive mechanism 98, while upper and lower pallet sensors 102 and 103 for detecting whether or not the upper and lower-stage machining pallets 24 and 25 are positioned at the upper and lower machining positions S21 and S22 are connected to the control unit 101 as well as the sensors 841, 842, 851 and 852. The pallet sensors 102 and 103 are, as shown in FIG. 11, attached to the stopper plate 86 to detect approach of operation markers 871 and 872 secured to the mounting plate of the upper pallet 24 or the lower pallet 25 so that the pallet sensors 102 and 103 are operated. When either of the upper and lower-stage machining pallets 24 and 25 is positioned at the predetermined machining position S21 or S22, the upper pallet sensor 102 or the lower pallet sensor 103 is operated. When the upper-stage machining pallet 24 or the lower-stage machining pallet 25 has been detected at the predetermined position, a machining start signal is output from the control unit 101 to the Z-axis directional drive mechanism 98 of the laser-beam machining head 97. If the upper-stage machining pallet 24 is detected for example, the laser-beam machining head 97 is moved downwards to the work piece 13 placed on the upper-stage machining pallet 24. At this time, the nozzle 99 is moved downwards at high speed from home position P1 toward the work piece 13. When a gap sensor 104 attached to the lower end of the laser-beam machining head 97 has brought into contact with the upper surface of the work piece 13 and thus the lower tip end of the nozzle 99 has been moved to a predetermined downward height position P2 apart from the work piece 13 by a predetermined distance, the speed is switched to low speed and then further downward movement is continued. After that, a distance sensor (not shown) included in the gap sensor 104 detects the distance from the nozzle 99 to the work piece 13. Data of the detected distance is supplied to the control unit 101. When data about the distance has reached a value previously set to the control unit 101, the low-speed downward movement of the laser-beam machining head 97 is stopped. Thus, the nozzle 99 is stopped at a machining height position P3 (so called hereinafter as an upper machining position P3) where the tip end of the nozzle 99 is positioned at a predetermined machining height apart from the upper surface of the upper work piece 13 by a predetermined distance, and the laser machining is commenced at the position P3.

Referring to FIG. 12, when the upper-stage machining pallet 24 has returned to setting position S11 and the pallet sensor 103 has detected the lower-stage machining pallet 25 in a state where the lower-stage machining pallet 25 has been positioned at the lower machining position S22, a machining signal is output from the control unit 101 to the Z-axis directional drive mechanism 98 of the machining head 97. Thus, the nozzle 99 is moved downwards from the home position P1 toward the lower work piece 13 at high speed. When the gap sensor 104 attached to the lower end of the laser-beam machining head 97 has brought into contact with the upper surface of the lower work piece 13 and thus the lower tip end of the nozzle 99 has reached to a predetermined downward height position P4 apart from the work piece 13 by a predetermined distance, the speed is switched to low speed and the downward movement is continued. Then, the gap sensor 104 detects the distance from the nozzle 99 to the work piece 13, and then data of the detected distance is supplied to the control unit 101. When data of the distance has reached a value previously set to the control unit 101, the low-speed downward movement of the laser-beam machining head 97 is stopped and the nozzle 99 is stopped at a machining height position P5 (so called hereinafter as a lower machining position P5) at a machining height apart from the upper surface of the lower work piece 13 by a predetermined distance, and the laser machining is commenced at the position P5.

The operation of the laser beam machining apparatus having the above-mentioned structure will now be described.

FIG. 4 shows a state where the upper-stage machining pallet 24 has been stopped at the upper setting position S11 and the lower-stage machining pallet 25 has been moved and brought to the lower machining position S22. In the above-mentioned state, the work piece 13 is placed on the projections 52 of the upper-stage machining pallet 24 and the end of the work piece 13 is clamped by the clamp bar 63 to secure the work piece 13 (see FIG. 6). When a machining start switch on an operation panel (not shown) of the work-piece supply unit 12 is operated to forwards rotate the motor 76 having speed reduction gears after the work piece 13 has been set, the driving sprocket wheel 78 is rotated clockwise when viewed in FIG. 4. As a result, the upper-stage machining pallet 24 is moved from the upper setting position S11 to the upper machining position S21 while the upper-stage machining pallet 24 is guided by the upper pallet-support roller 43 and the upper-pallet guide bar 47. When the upper-stage machining pallet 24 has approached the upper machining position S21, the mounting bracket 72 attached to the front-end frame 511 of the upper-stage machining pallet 24 is detected by the upper deceleration sensor 841 so that the rotations of the motor 76 having speed reduction gears for the high speed movement are switched to those for the low-speed movement. When the upper-stage machining pallet 24 has been further forwards moved and thus the upper stoppage sensor 851 has detected the mounting bracket 72 attached to the front-end frame 511 of the upper-stage machining pallet 24, the rotations of the motor 76 having speed reduction gears are stopped. Thus, the upper-stage machining pallet 24 is, as shown in FIG. 11, positioned to the upper machining position S21 because the stop bolt 881 of the upper-stage machining pallet 24 is brought into contact with the stopper plate 86.

Since the lower-stage machining pallet 25 is moved from the lower machining position S22 to the lower setting position S12 in synchronization with the movement of the upper-stage machining pallet 24 from the upper setting position S11 to the upper machining position S21, a work piece 13 to be machined next is placed on the lower-stage machining pallet 25 at the lower setting position S12.

When the upper-stage machining pallet 24 at the upper machining position S21 has been detected by the upper pallet sensor 102, a signal for indicating the detection is supplied to the control unit 101. Therefore, the operation for machining the work piece 13 on the upper-stage machining pallet 24 is commenced. Thus, the laser-beam machining head 97 is moved downwards at higher speed by the Z-axis directional drive mechanism 98. Then, the nozzle 99 is, as described above, moved downwards from the home position P1 toward the upper work piece 13 when viewed in FIG. 12. When the gap sensor 104 has been moved to the position P2 at which it is in contact with the upper surface of the work piece 13, the speed of the downward movement of the laser-beam machining head 97 is switched to the low speed. When the gap sensor 104 has detected the predetermined height from the upper surface of the upper work piece 13, the Z-axis directional drive mechanism 98 is stopped and thus the nozzle 99 is stopped at the position P3 at the height on which the laser machining of the work piece 13 is commenced.

In the above-mentioned state, the X-axis directional drive mechanism 93 and the Y-axis directional drive mechanism 95 are properly operated in accordance with a cutting program previously stored in a memory of the control unit 101 to control the movement of the laser-beam machining head 97 so that the upper work piece 13 is machined with laser beams to have a required shape.

After the operation for machining the work piece 13 on the upper-stage machining pallet 24 has been completed, the nozzle 99 is returned from the upper machining position P3 to the home position P1. Then, the motor 76 having speed reduction gears of the chain drive mechanism 26 is reversely rotated. In a retrograde order, the upper-stage machining pallet 24 is moved from the upper machining position S21 to the upper setting position S11 and the lower-stage machining pallet 25 is moved from the lower setting position S12 to the lower machining position S22 in synchronization with the movement of the upper-stage machining pallet 24. When the lower-stage machining pallet 25 has approached the lower machining position S22, the deceleration sensor 842 switches the rotations of the motor 76 having speed reduction gears to those for the low speed. When the stoppage sensor 852 has detected the lower-stage machining pallet 25 after that, the rotations of the mounting frame 75 are stopped. At this time, the lower stop bolt 882 disposed in the front end portion of the lower-stage machining pallet 25 is brought into contact with the stopper plate 86, as indicted with a chain line shown in FIG. 11. Thus, the lower-stage machining pallet 25 is positioned at the lower machining position S22.

When the pallet sensor 103 has detected the lower-stage machining pallet 25 in the above-mentioned state, a signal for indicating the detection is supplied to the control unit 101. As a result, the operation for machining the work piece 13 on the lower-stage machining pallet 25 is commenced. Thus, the Z-axis directional drive mechanism 98 of the laser-beam machining head 97 is operated so that the nozzle 99 is moved downwards at high speed from the home position P1 toward the work piece 13 on the lower-stage machining pallet 25. When the gap sensor 104 has been moved to the position P4 at which it is in contact with the upper surface of the work piece 13, the downward movement speed of the laser-beam machining head 97 is switched to the low speed. When the gap sensor 104 of the laser-beam machining head 97 has detected the predetermined height from the upper surface of the lower work piece 13, the nozzle 99 is stopped at the lower position P5 at the machining height. In the above-mentioned state, the X-axis directional drive mechanism 93 and the Y-axis directional drive mechanism 95 are arbitrarily operated to move the laser-beam machining head 97. Thus, an operation for machining the lower work piece 13 with laser beams is performed to have a required shape.

After the operation for machining the work piece 13 on the lower-stage machining pallet 25 has been completed, the nozzle 99 is returned from the lower machining position P5 to the home position P1. Then, the operation for machining the work pieces 13 on the upper and lower-stage machining pallets 24 and 25 is repeated.

The embodiment of the present invention attains the following effects.

(1) The foregoing embodiment is structured in such a way that the upper-stage machining pallet 24 and the lower-stage machining pallet 25 can be moved between the upper and lower setting positions S11 and S12 and the upper and lower machining positions S21 and S22 with respect to the frame 21 by the chain drive mechanism 26. Moreover, the nozzle 99 of the laser-beam machining head 97 can be, by the Z-axis directional drive mechanism 98, moved upwards/downwards between the position P3 at the height at which the work piece 13 on the upper-stage machining pallet 24 is machined and the position P5 at the height at which the work piece 13 on the lower-stage machining pallet 25 is machined. Therefore, the mechanism for upwards/downwards moving the upper and lower-stage machining pallets 24 and 25 can be omitted and thus the structure can be simplified. Moreover, the efficiency of the laser-beam machining operation can be improved. In addition, a complicated unit for vertically moving a pallet for a pallet storage unit as has been employed by the conventional structure can be omitted. As a result, the structure can be simplified.

(2) Since the above-mentioned embodiment is structured in such a manner that the positions of the upper-stage machining pallet 24 and the lower-stage machining pallet 25 can be switched by the single chain drive mechanism 26, the mechanism for moving the pallet in the lengthwise direction (i.e. forward-rearward direction) can be simplified.

(3) Since the above-mentioned embodiment is structured in such a manner that the upper and lower guide mechanisms 22 and 23 are formed by the upper and lower pallet-support rollers 43 and 44 and the upper and lower-pallet guide bars 47 and 49, the structure can be simplified.

(4) Since the above-mentioned embodiment is structured in such a manner that the deep pallet 66 is disposed below the lowermost machining pallet 25, a high box-like, that is, stereoscopic work piece 14 can be placed in the deep pallet 66 to machine the work piece 14 when the members 53, 56, 58, 61 and the 63 and the protections 52 on the inside of the square frame 51 of the lowermost machining pallet 25 are removed. Therefore, a work piece having a considerably different shape can be machined as well as flat work pieces as have been machined by the conventional apparatus.

(5) The above-mentioned embodiment has the structure that the machining head 97 has the gap sensor 104 to serve as the distance detection means and the control unit is provided which detects the distance from the nozzle 99 to the work piece 13 on the machining pallet on each stage to stop the nozzle 99 at the machining height. Therefore, the nozzle 99 can be maintained at a proper machining height to be adaptable to the height of the work piece placed on the machining pallet for each stage to smoothly perform machining.

Figure 13:
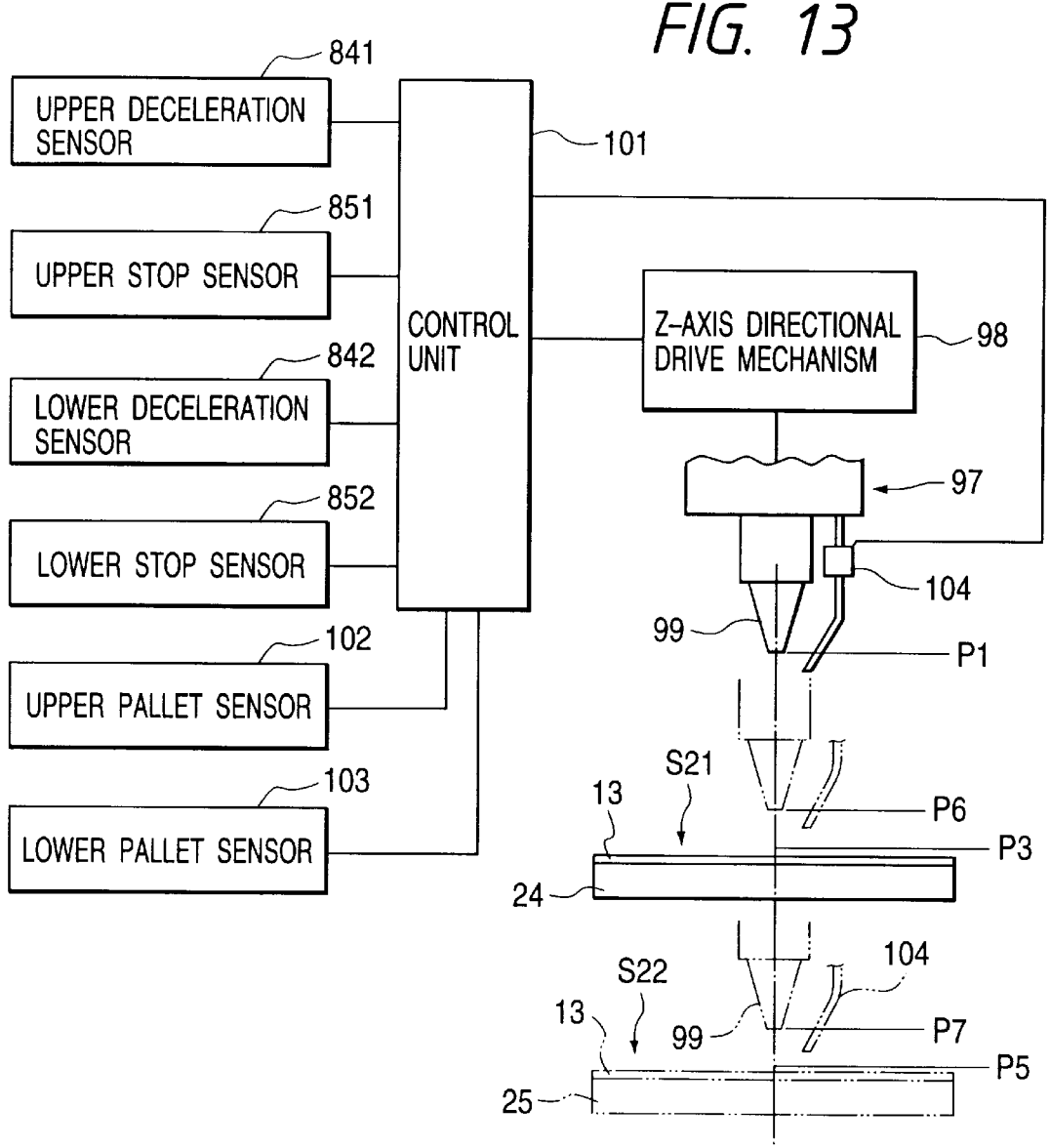
FIG. 13 is a diagram showing a machining head and a unit for controlling the machining head according to another embodiment of the present invention.
Figure 14:
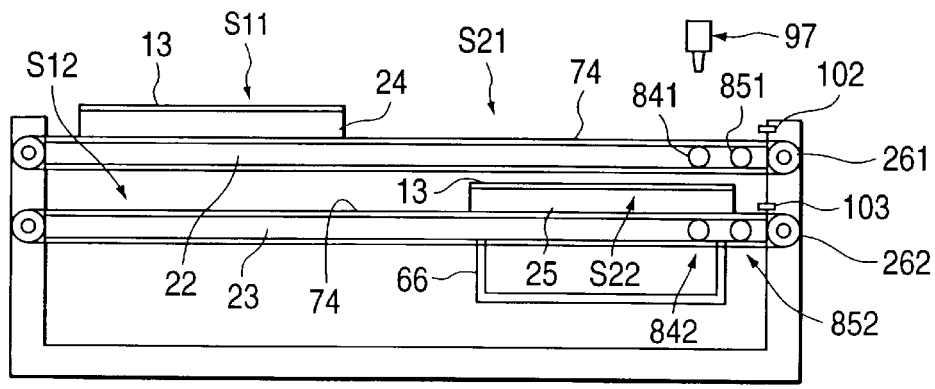
FIG. 14 is a front view schematically showing another embodiment of the present invention.

Referring to FIGS. 13 and 14, as the another embodiments according to the present invention, two control operations for the laser machining head 97 relating to the machining pallet on each stage will now be described.

(First Control Operation)

As shown in FIG. 13, when the machining pallet 24 or 25 on each stage has been moved to the machining position S21 or S22, that is, when the pallet sensor 102 or 103 serving as the pallet detection means for the upper stage or the lower stage has been operated, the machining head 97 is moved downwards to correspond to high-speed downward movement completion position P6 or P7 which has been previously set for the nozzle 99 by the control unit 101 for each stage and has the height apart from the work piece by a predetermined distance. Then, the machining head 97 is, at low speed, moved downwards from the high-speed downward movement completion height position P6 or P7 to the machining height position P3 or P5. As a result, an impact made by the gap sensor 104 which is brought into contact with the work piece 13 after the machining head 97 has been moved downwards at high speed can be moderated.

(Second Control Operation)

As shown in FIG. 14, when the reduction sensor 841 or 842 provided for each stage to serve as the position detection means has detected the machining pallet 24 or 25 when the machining pallets 24 and 25 for the corresponding stages are moved to the machining position S21 or S22, the machining head 97 is, at high speed, moved downwards from the home position P1 to correspond to the high-speed downward movement completion height position P6 or P7 for the nozzle 97 which has been previously set to the control unit 101 for each stage. Then, a state where the machining pallet 24 or 25 is moved to the machining position S21 or S22 is waited while the machining head 97 is kept at the above-mentioned position. When the machining pallet 24 or 25 has been moved to the machining position S21 or S22 and the pallet sensor 102 or 103 serving as the pallet detection means has been operated, the laser machining head 97 is, at low speed, moved downwards to the machining height position P3 or P5 in accordance with a distance from the nozzle 99 to the work piece. As a result, the time at which the machining head performs the downward movement to the downward-movement standby position can be hastened as compared with the state where the downward movement of the nozzle 99 is commenced after the machining pallet 24 or 25 has been brought to the machining position S21 or S22. Thus, the time required for the machining operation to be commenced can be shortened.

The present invention is not limited to the above-mentioned embodiments and the following modifications are permitted.

(A) Although the above-mentioned embodiment is structured in such a manner that the single chain drive mechanism 26 causes the upper and lower-stage machining pallets 24 and 25 to perform the reciprocating operation, the upper and lower-stage machining pallets 24 and 25 may be allowed to reciprocate by individual chain drive mechanisms 261 and 262 as shown in FIG. 14. In this case, the process becomes somewhat complicated as compared with the above-mentioned embodiment. However, the position of the lower-stage machining pallet 25 may arbitrarily be switched during a process for machining the work piece 13 on the upper-stage machining pallet 24 with laser beams. Therefore, the efficiency of machining the work piece can be improved to correspond to the machining condition.

Figure 15:
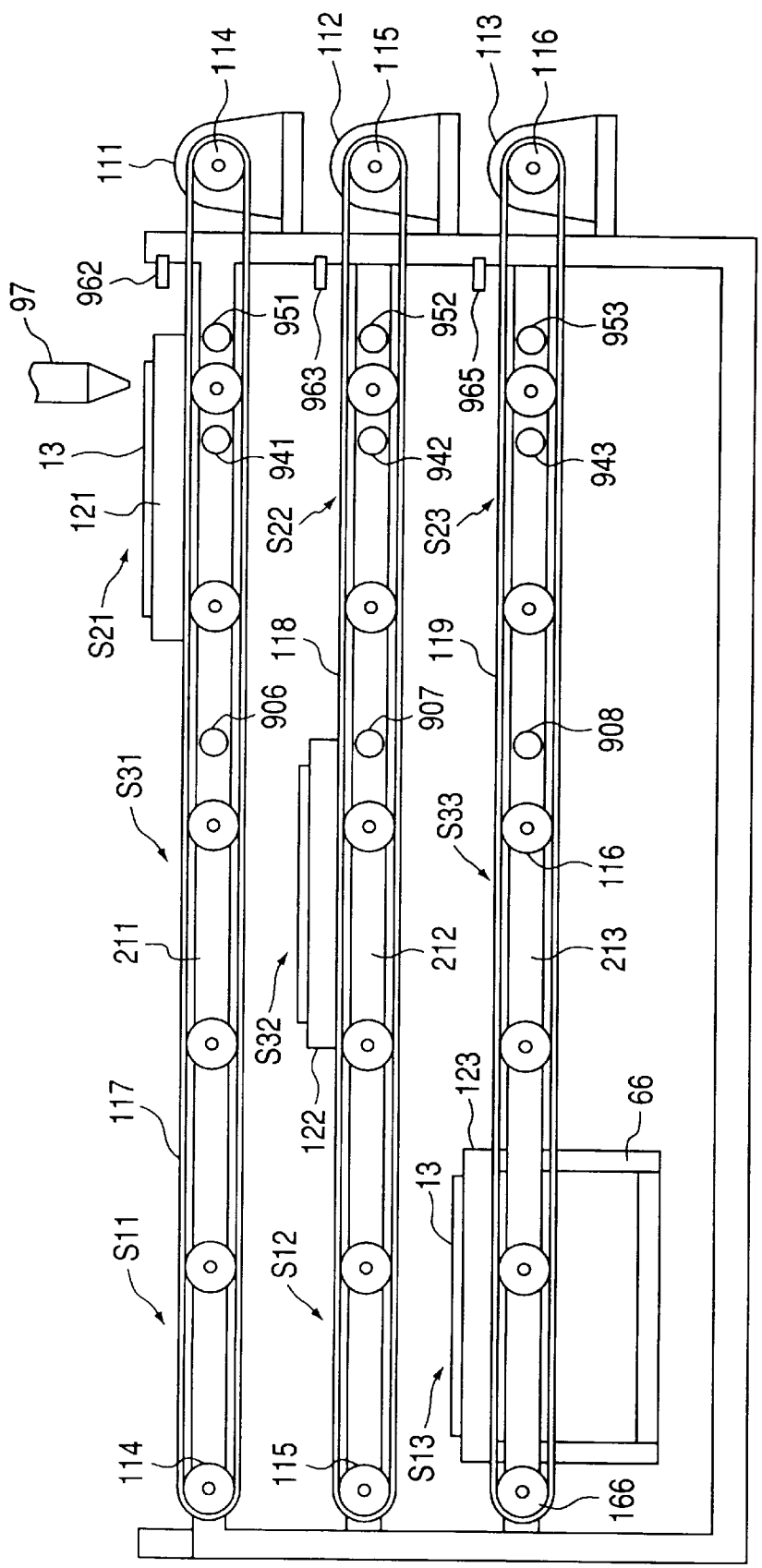
FIG. 15 is a front view schematically showing another embodiment of the present invention.

(B) Although the above-mentioned embodiments has been described about the laser machining apparatus having the machining pallets on the two stages formed vertically, the machining pallets may be disposed on three stages formed vertically, as shown in FIG. 15. In this embodiment, a belt drive mechanism comprising first to third drive motors 111, 112 and 113, and drive and driven rollers 114, 115 and 116 and belts 117, 118 and 119 is provided for horizontal support frames 211, 212 and 213 on the upper, intermediate and lower stages of the frame 21. Moreover, first to third machining pallets 121, 122 and 123 are mounted on the belts 117, 118 and 119.

In this embodiment, first to third standby positions S31, S32 and S33 are provided between the first to third setting positions S11, S12 and S13 and the first to third machining positions S21, S22 and S23.

Further, in the laser machining apparatus in the above-mentioned embodiment, first to third deceleration sensors 941, 942 and 943, first to third stoppage sensors 951, 952 and 953, and first to third pallet sensors 962, 963 and 965 for the first to third machining pallets 121, 122 and 123 are respectively provided in correspondence with the machining positions on the upper, intermediate and lower stages of the frame. In addition, first to third pallet sensors 906, 907 and 908 are respectively provided in correspondence with the first to third standby positions on the upper, intermediate and lower stages of the frame so as to detect the fact that each of first to third machining pallets 121, 122 and 123 has been moved to its standby position, so that it becomes possible to stop anyone of the pallets at its standby positions if necessary.

In this embodiment, the machining pallets 121, 122 and 123 are respectively moved so as to switch their positions by first to third drive motors 111, 112 and 113 which are independent from one another, so that the apparatus is controlled in such a manner that when only one of the pallet sensors 962, 963 and 965 is operated at its machining positions on its stage the laser-beam machining head 97 is allowed to move toward the machining pallet disposed on the stage where the one of the pallet sensors thus operated is located. Accordingly, the nozzle 99 of the laser-beam machining head 97 can be prevented from coming into collision with the machining pallets on the different stages.

Therefore, the above-mentioned embodiment enables the second machining pallet 122, positioned above the third machining pallet 123, to be moved and stopped at the second standby position S32 when the machining pallet required to be set is the third machining pallet 123. Thus, the setting operation can furthermore easily be performed.

(C) Although the chain drive mechanism 26 is employed in the above-mentioned embodiment, a belt, a wire or a fluid-pressure reciprocating mechanism may be employed in place of the chain drive mechanism 26. Another structure may be employed in which the upper and lower-stage machining pallets 24 and 25 are synchronously or independently moved in the lengthwise direction by a ball screw feed device mechanism and a ball nut or a rack and pinion mechanism.

(D) Guide rails are disposed horizontally with respect to the frame 21 to support automotive upper and lower machining pallets with respect to the guide rails so as to enable the positions of the respective pallets to independently be switched.

(E) A laser machining apparatus having machining pallets for four or more stages can be realized.

As described above, a laser beam machining apparatus according to the present invention which comprises: a frame; a plurality of machining pallets respectively disposed on a plurality of stages stacked in a vertical direction with respect to the frame for supporting work pieces; a carriage mechanism for reciprocating and guiding each of the machining pallets between a setting position and a machining position on each stage, the carriage mechanism having a plurality of guide mechanisms for respectively guiding the machining pallets with respect to the frame in such a manner that each of the mechanism pallets is able to reciprocate between the setting position and the machining position therealong on each stage; and a laser machining head vertically movable in accordance with the height of the work piece on each of the machining pallets for machining the work piece with laser beams, so that it is possible to attain an excellent effect in that the unit for upwards/downwards moving the plurality of machining pallets respectively disposed on a plurality of stages stacked in a vertical direction can be omitted and thus the efficiency of performing the laser beam machining operation can be improved.

In addition, in the above-mentioned structure, the machining pallets may be alternately moved to the corresponding machining positions by a single carriage mechanism, so that it is possible to simplify the mechanism for moving the plurality of machining pallets respectively disposed on the plurality of stages stacked in the vertical direction, in addition to the effect obtainable from the foregoing-mentioned structure.

Further, in the above-mentioned structure, the machining pallets may be respectively moved by independent carriage mechanisms, so that it is possible to improve the efficiency of performing the laser beam machining operation because the plurality of machining pallets respectively disposed on the plurality of stages stacked in the vertical direction can independently be moved into required directions to be adaptable to the condition under which a work piece is machined, in addition to the effect obtainable from the foregoing-mentioned structure.

Furthermore, in the above-mentioned structure, the carriage mechanism may be one of a chain drive mechanism, a ball screw feed drive mechanism, a belt drive mechanism, a cylinder mechanism and a rack-and-pinion mechanism, so that it is possible to simplify the structure of the mechanism for moving the upper and lower-stage machining pallets in addition to the effect obtainable from the foregoing-mentioned structure.

Still furthermore, in the above-mentioned structure, each of the guide mechanisms may be formed by comprising: a plurality of support rollers rotatively disposed on both side portions of the frame through a bracket member for guiding and supporting the corresponding machining pallet in such a manner that the corresponding machining pallet is able to reciprocate in a pallet moving direction; and a pair of pallet guide bars for guiding both side surfaces of the corresponding machining pallet in the pallet moving direction, so that it is possible to simplify the structure of the mechanism for guiding the plurality of machining pallets to smoothly performing the guiding operation in addition to the effect obtainable from the foregoing-mentioned structure.

Moreover, in the above-mentioned structure, the lowermost machining pallet may have a deep pallet in the lower portion thereof, and a work support portion of the lowermost machining pallet may be opened when the deep pallet is used, so that it is possible to machine a high and stereoscopic work piece in addition to the effect obtainable from the foregoing-mentioned structure.

In addition, the above-mentioned structure may further comprises: pallet detection means for each stage which detects movement of each machining pallet to the corresponding machining position; and a control unit for downwardly moving the laser machining head to a predetermined downward height in response to a detection signal supplied from the pallet detection means to be adaptable to the position of the corresponding machining pallet and then further downwardly moving the laser machining head to a machining height, apart from the work piece by a predetermined distance, at which the work piece on the corresponding machining pallet is machined, so that in addition to the effect obtainable from the foregoing-mentioned structure, it is possible reduce an impact made when a portion of the laser machining head, for example a gap sensor, is brought into contact with a work piece.

Further, the above-mentioned structure may further comprises: position detection means for each stage which detects the position of the machining pallet prior to movement of the machining pallet on each stage to each machining position; pallet detection means for each stage which detects the movement of the machining pallet on each stage to each machining position; and a control unit for downwardly moving the laser machining head to a predetermined downward height in response to a detection signal supplied from the position detection means to be adaptable to the position of the corresponding machining pallet, and further downwardly moving the laser machining head to a machining height, apart from the work piece by a predetermined distance, at which the work piece is machined after the movement of the machining pallet to the machining position has been detected by the pallet detection means, so that in addition to the effect obtainable from the foregoing-mentioned structure, it is possible to allow the time at which machining of a work piece is commenced to be hastened and to improve the efficiency of the machining operation.

Furthermore, in the above-mentioned structure, the laser machining head may comprises: a distance detection means for detecting a distance between a nozzle of the laser machining head and the work piece on the machining pallet; and a control unit for moving the laser machining head at a machining height at which the work piece on the machining pallet is machined in response to a detection signal supplied from the distance detection means, so that in addition to the effect obtainable from the foregoing-mentioned structure it is possible to allow time at which machining is commenced to be hastened by stopping the laser machining head at a proper height to be adaptable to the height of the work piece placed on the machining pallet for each stage and to thereby improve the efficiency of the machining operation.

Moreover, in the above-mentioned structure, the machining pallets may be respectively disposed on not less than three stages stacked in the vertical direction, and a machining pallet waiting position may be provided at an intermediate position between the setting position for each stage at which work pieces are mounted and removed and the machining position for each stage at which laser machining is performed, so that in addition to the effect obtainable from the foregoing-mentioned structure, it is possible to perform the operation for setting the machining pallet easily.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A laser beam machining apparatus comprising:
    a frame;
    a plurality of machining pallets respectively disposed on a plurality of stages stacked in a vertical direction with respect to said frame for supporting work pieces;
    a carriage mechanism for reciprocating and guiding each of said machining pallets between a setting position and a machining position on each stage, said carriage mechanism having a plurality of guide mechanisms for respectively guiding said machining pallets with respect to said frame in such a manner that each of said mechanism pallets is able to reciprocate between said setting position and said machining position therealong on each stage; and
    a laser machining head vertically movable in accordance with the height of the work piece on each of said machining pallets for machining the work piece with laser beams,
    wherein the lowermost machining pallet has a deep pallet in the lower portion thereof, and a work piece support portion of said lowermost machining pallet is opened when said deep pallet is used.

2. The laser beam machining apparatus according to claim 1, wherein said machining pallets are alternately moved to the corresponding machining positions by a single carriage mechanism.

3. The laser beam machining apparatus according to claim 2, further comprising:
    pallet detection means for each stage which detects movement of the corresponding machining pallet to the corresponding machining position; and
    a control unit for downwardly moving said laser machining head to a predetermined downward height in response to a detection signal supplied from said pallet detection means to be adaptable to the position of the corresponding machining pallet and then further downwardly moving said laser machining head to a machining height, apart from the work piece by a predetermined distance, at which the work piece on the corresponding machining pallet is machined.

4. The laser beam machining apparatus according to claim 2, wherein said carriage mechanism is one of a chain drive mechanism, a ball screw feeding drive mechanism, a belt drive mechanism, a cylinder mechanism and a rack-and-pinion mechanism.

5. The laser beam machining apparatus according to claim 2, further comprising:
    position detection means for each stage which detects the position of the machining pallet prior to movement of the machining pallet on each stage to each machining position;
    pallet detection means for each stage which detects the movement of the machining pallet on each stage to each machining position; and
    a control unit for downwardly moving said laser machining head to a predetermined downward height in response to a detection signal supplied from said position detection means to be adaptable to the position of the corresponding machining pallet, and further downwardly moving said laser machining head to a machining height, apart from the work piece by a predetermined distance, at which the work piece is machined after the movement of the corresponding machining pallet to the corresponding machining position has been detected by said pallet detection means.

6. The laser beam machining apparatus according to claim 2, wherein said laser machining head comprises:
    a distance detection means for detecting a distance between a nozzle of said laser machining head and the work piece on the machining pallet; and
    a control unit for moving said laser machining head to a machining height at which the work piece on the machining pallet is machined in response to a detection signal supplied from said distance detection means.

7. The laser beam machining apparatus according to claim 2, wherein each of said guide mechanisms comprise;
    a plurality of support rollers rotatively disposed on both side portions of said frame through a bracket member for guiding and supporting the corresponding machining pallet in such a manner that the corresponding machining pallet is able to reciprocate in a pallet moving direction; and
    a pair of pallet guide bars for guiding both side surfaces of the corresponding machining pallet in the pallet moving direction.

8. The laser beam machining apparatus according to claim 2, wherein said machining pallets are respectively disposed on not less than three stages stacked in the vertical direction, and a machining pallet waiting position is provided at an intermediate position between the setting position for each stage at which work pieces are mounted and removed and the machining position for each stage at which laser machining is performed.

9. The laser beam machining apparatus according to claim 1, wherein said machining pallets are respectively moved by independent carriage mechanisms.

10. The laser beam machining apparatus according to claim 9, wherein said carriage mechanism is one of a chain drive mechanism, a ball screw feeding drive mechanism, a belt drive mechanism, a cylinder mechanism and a rack-and-pinion mechanism.

11. The laser beam machining apparatus according to claim 9, wherein each of said guide mechanisms comprise:
   a plurality of support rollers rotatively disposed on both side portions of said frame through a bracket member for guiding and supporting the corresponding machining pallet in such a manner that the corresponding machining pallet is able to reciprocate in a pallet moving direction; and
   a pair of pallet guide bars for guiding both side surfaces of the corresponding machining pallet in the pallet moving direction.

12. The laser beam machining apparatus according to claim 9, further comprising:
   position detection means for each stage which detects the position of the machining pallet prior to movement of the machining pallet on each stage to each machining position;
   pallet detection means for each stage which detects the movement of the machining pallet on each stage to each machining position; and
   a control unit for downwardly moving said laser machining head to a predetermined downward height in response to a detection signal supplied from said position detection means to be adaptable to the position of the corresponding machining pallet, and further downwardly moving said laser machining head to a machining height, apart from the work piece by a predetermined distance, at which the work piece is machined after the movement of the corresponding machining pallet to the corresponding machining position has been detected by said pallet detection means.

13. The laser beam machining apparatus according to claim 9, wherein said machining pallets are respectively disposed on not less than three stages stacked in the vertical direction, and a machining pallet waiting position is provided at an intermediate position between the setting position for each stage at which work pieces are mounted and removed and the machining position for each stage at which laser machining is performed.

14. The laser beam machining apparatus according to claim 9, further comprising:
   pallet detection means for each stage which detects movement of the corresponding machining pallet to the corresponding machining position; and
   a control unit for downwardly moving said laser machining head to a predetermined downward height in response to a detection signal supplied from said pallet detection means to be adaptable to the position of the corresponding machining pallet and then further downwardly moving said laser machining head to a machining height, apart from the work piece by a predetermined distance, at which the work piece on the corresponding machining pallet is machined.

15. The laser beam machining apparatus according to claim 9, wherein said laser machining head comprises:
   a distance detection means for detecting a distance between a nozzle of said laser machining head and the work piece on the machining pallet; and
   a control unit for moving said laser machining head to a machining height at which the work piece on the machining pallet is machined in response to a detection signal supplied from said distance detection means.

16. The laser beam machining apparatus according to claim 1, wherein each of said guide mechanisms comprise:
   a plurality of support rollers rotatively disposed on both side portions of said frame through a bracket member for guiding and supporting the corresponding machining pallet in such a manner that the corresponding machining pallet is able to reciprocate in a pallet moving direction; and
   a pair of pallet guide bars for guiding both side surfaces of the corresponding machining pallet in the pallet moving direction.

17. The laser beam machining apparatus according to claim 1, wherein said laser machining head comprises:
   a distance detection means for detecting a distance between a nozzle of said laser machining head and the work piece on the machining pallet; and
   a control unit for moving said laser machining head to a machining height at which the work piece on the machining pallet is machined in response to a detection signal supplied from said distance detection means.

18. A laser beam machining apparatus comprising:
   a frame;
   a plurality of machining pallets respectively disposed on a plurality of stages stacked in a vertical direction with respect to said frame for supporting work pieces;
   a carriage mechanism for reciprocating and guiding each of said machining pallets between a setting position and a machining position on each stage, said carriage mechanism having a plurality of guide mechanisms for respectively guiding said machining pallets with respect to said frame in such a manner that each of said mechanism pallets is able to reciprocate between said setting position and said machining position therealong on each stage;
   a laser machining head vertically movable in accordance with the height of the work piece on each of said machining pallets for machining the work piece with laser beams;
   pallet detection means for each stage which detects movement of the corresponding machining pallet to the corresponding machining position; and
   a control unit for downwardly moving said laser machining head to a predetermined downward height in response to a detection signal supplied from said pallet detection means to be adaptable to the position of the corresponding machining pallet and then further downwardly moving said laser machining head to a machining height, apart from the work piece by a predetermined distance, at which the work piece on the corresponding machining pallet is machined.

19. A laser beam machining apparatus comprising:
   a frame;
   a plurality of machining pallets respectively disposed on a plurality of stages stacked in a vertical direction with respect to said frame for supporting work pieces;
   a carriage mechanism for reciprocating and guiding each of said machining pallets between a setting position and a machining position on each stage, said carriage mechanism having a plurality of guide mechanisms for respectively guiding said machining pallets with respect to said frame in such a manner that each of said mechanism pallets is able to reciprocate between said setting position and said machining position therealong on each stage;

a laser machining head vertically movable in accordance with the height of the work piece on each of said machining pallets for machining the work piece with laser beams;

position detection means for each stage which detects the position of the machining pallet prior to movement of the machining pallet on each stage to each machining position;

pallet detection means for each stage which detects the movement of the machining pallet on each stage to each machining position; and a control unit for downwardly moving said laser machining head to a predetermined downward height in response to a detection signal supplied from said position detection means to be adaptable to the position of the corresponding machining pallet, and further downwardly moving said laser machining head to a machining height, apart from the work piece by a predetermined distance, at which the work piece is machined after the movement of the corresponding machining pallet to the corresponding machining position has been detected by said pallet detection means.

20. A laser beam machining apparatus comprising:

a frame;

a plurality of machining pallets respectively disposed on a plurality of stages stacked in a vertical direction with respect to said frame for supporting work pieces;

a carriage mechanism for reciprocating and guiding each of said machining pallets between a setting position and a machining position on each stage, said carriage mechanism having a plurality of guide mechanisms for respectively guiding said machining pallets with respect to said frame in such a manner that each of said mechanism pallets is able to reciprocate between said setting position and said machining position therealong on each stage; and a laser machining head vertically movable in accordance with the height of the work piece on each of said machining pallets for machining the work piece with laser beams, wherein said machining pallets are respectively disposed on not less than three stages stacked in the vertical direction, and a machining pallet waiting position is provided at an intermediate position between the setting position for each stage at which work pieces are mounted and removed and the machining position for each stage at which laser machining is performed.

* * * * *